March 24, 1970  J. L. PERKINS  3,501,859
FISHING POLE REEL SEAT
Filed June 13, 1968
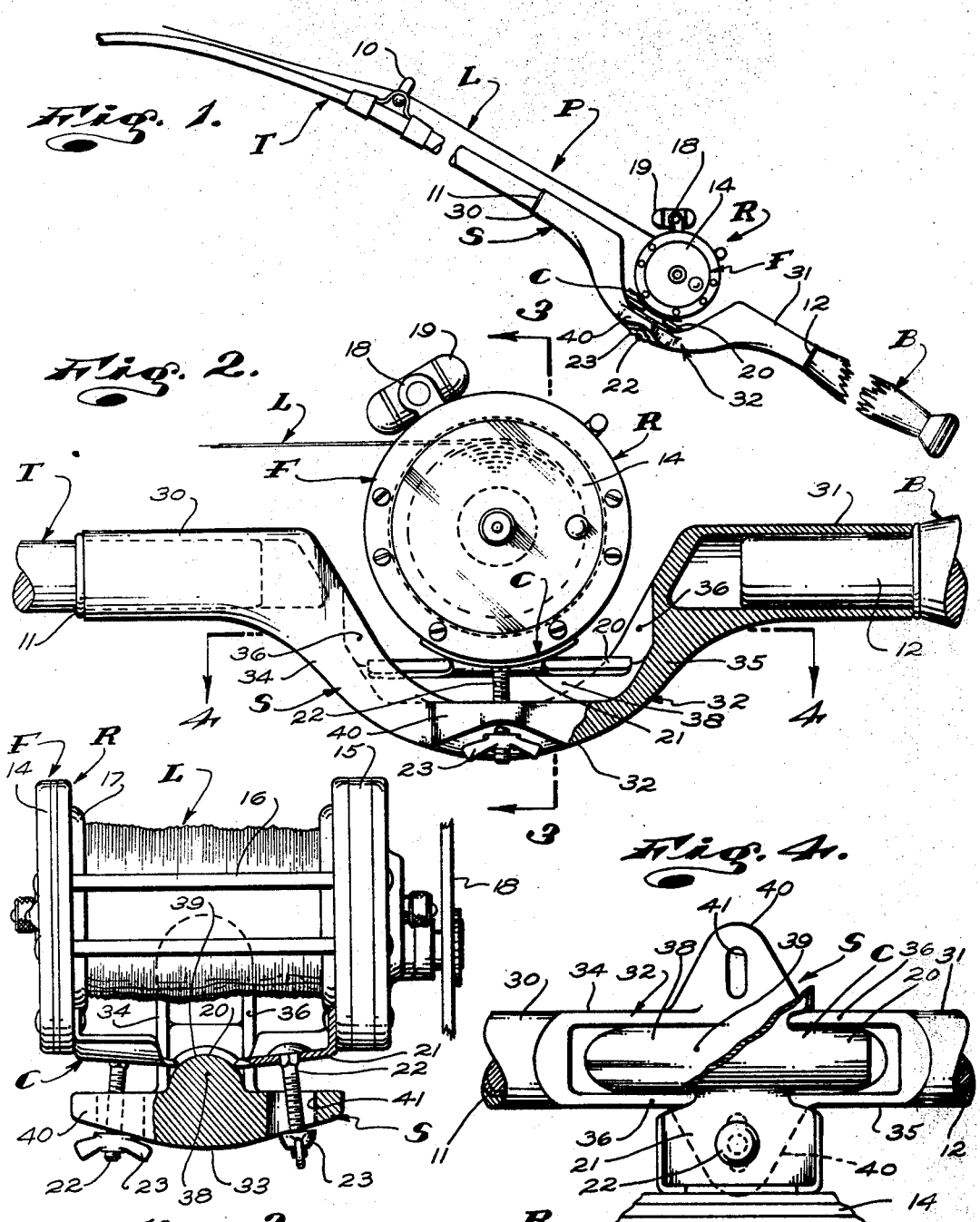
Inventor
John L. Perkins
By
George A. Turriwell
Attorney

United States Patent Office 3,501,859
Patented Mar. 24, 1970

3,501,859
FISHING POLE REEL SEAT
John L. Perkins, 22021 Catalina Circle,
Huntington Beach, Calif. 92646
Filed June 13, 1968, Ser. No. 736,760
Int. Cl. A01k 87/06
U.S. Cl. 43—22    9 Claims

ABSTRACT OF THE DISCLOSURE

A fishing rig including a pole assembly comprising a pole tip, reel seat and pole butt; a spool-type reel and a line. The reel seat has axially aligned, axially spaced pole tip and pole butt engaging portions and an upwardly opening U-shaped central portion in which the reel is arranged. The central portion having a longitudinally extending laterally crowned seat spaced below the axes of the end portions and parallel therewith, laterally spaced retaining flanges at the ends of the seat and central, laterally outwardly projecting flanges with laterally extending slots. The reel having a mounting saddle with a central longitudinally extending pad engaging the seat with its ends between the retaining flanges and carrying laterally spaced studs which depend through the slots; and nuts on the lower ends of the studs and engaging the flanges to hold the pad tight on the seat.

---

This invention has to do with fishing equipment and is more particularly concerned with a new combination fishing pole, reel and like, involving a novel reel seat.

The ordinary or conventional fishing pole includes an elongate butt with front and rear ends, an elongate, flexible, normally tapered tip with front and rear ends and an elongate, tubular reel seat with open front and rear ends and arranged between the butt and the tip, with the rear end of the tip engaged and fixed in its front end and the front end of the butt engaged and fixed in its rear end.

The ordinary fishing reel, more particularly, the ordinary spool-type fishing reel involves an elongate, substantially cylindrical frame with disc-like end plate, circumferentially spaced tie bars between the end plates, a spool within the frame and rotatably supported by and between the end plates, operating means for turning the spool and including a manually engageable handle or crank accessible at one end of the frame and a mounting pad or saddle for mounting the reel to the reel seat of a related fishing pole with the axis of the frame and spool spaced above and extending normal to the axis of the reel seat. The reel saddle includes an elongate, semi-cylindrical reel seat-engaging pad adjacent to the lower or bottom side of the frame, intermediate the ends of the frame and on an axis normally to the frame. The pad has front and rear tab-like end portions and defines a downwardly opening reel seat engaging surface. The pad is provided with central laterally projecting wing-like arms which extend to and which are suitably fixed to their related end plates of the reel frame.

The ordinary reel seat is provided with a fixed sleeve defining an axially opening recess to receive one tab-like end portion of a reel pad, an axially shiftable collar defining an axially opening recess to receive the other tab-like end portion of the reel seat and one or more lock rings threaded on and about the seat and engaging the collar to urge it axially towards the sleeve and onto or about the second tab-like end of the pad and to hold the reel fixed to the reel seat.

Due to the tendency for the lock rings to become loose, with resulting displacement and often times loss of the reel, the ordinary reel is provided with a pair of laterally spaced, threaded studs carried by the wings on the reel pad to depend therefrom and to occur at opposite sides of the reel seat, a clamp bar extending transverse the under side of the reel seat and having openings to receive the studs and nuts engaged on the studs and acting on the bar to hold the reel seat clamped between the bar and pad.

In addition to the foregoing, the ordinary fishing pole tip is provided with longitudinally spaced ring-like line guides at its upper side and forward end. The reel spool carries a length of fishing line which extends from the reel, longitudinally of the pole tip and through the guides.

With the ordinary or conventional fishing rig set forth above, the reel occurs wholly above the central longitudinal axis of the pole with the result that the axis of the manually engageable and operable reel crank is spaced a substantial distance above the axis of the pole. As a result of the above, there exists a lever arm between the axes of the reel crank and pole which upsets the balance between the reel and pole and which imparts detrimental and undesirable turning movements onto and through the rig when the reel is cranked to wind in the fishing line. The adverse effects noted above are accentuated and become increasingly disadvantageous as the load and strain on the line increases and/or as the fisherman becomes fatigued.

Attempts have been made to provide better balanced fishing rigs of the character referred to by providing special reels with pole tip and pole butt receivers built into them and so that the axis of the tips and butts intersect the axis of the reel spool or the axis of the reel crank.

While such reel structures have proven satisfactory, they must be custom-built for the pole tips and butts with which they are to be related, or the pole tips and butts must be custom built to match the reels. In any event, they are extremely costly.

Further, in such special reel structures, the pole tips and butts are normally fixed permanently to the reels and so that the rigs cannot be advantageously disassembled for service and storage.

Another and less costly attempt to provide a balanced reel and fishing pole rig involves the provision of a special reel seat wherein the portion of the seat which supports the reel pad and which carries the pad engaging sleeve, collar and lock rings are offset below the forward end of the seat structure in which the pole tip is engaged and so that the axis of the reel is lowered. The difficulty with this structure resides in the fact that the means for securing the reel in place and which serve to maintain the reel in alignment in the seat and with the pole tip are still subject to becoming loose.

An object of this invention is to provide a novel reel seat construction which is such that the reel is arranged so the axis of the pole tip and butt intersects the spool portion of the reel and the axis of the reel crank intersects or is arranged near to intersecting the axis of the pole tip and butt.

Another object of this invention is to provide a reel seat of the character referred to having axially aligned tubular end portions to slidably receive adjacent ends of a pole tip and pole butt, a downwardly offset central portion with an elongate axially extending convex top, reel pad-engaging surface and central laterally outwardly projecting slotted wings to receive laterally spaced depending studs carried by the reel frame and adapted to be engaged by nuts carried by the studs to hold the reel pad tight on the seat.

Yet another object is to provide a structure of the character referred to having laterally spaced retaining flanges at the opposite end portions of the convex top surface to engage the opposite sides of the tab-like end portions of the reel seat pad and to prevent turning and twisting of the reel relative to the reel seat.

Still another object of my invention is to provide a reel seat construction of the character referred to wherein the central vertical plane of the reel is positioned at a fixed, predetermined location longitudinally of the reel seat and is not subject to longitudinal displacement or longitudinal shifting with resulting upsetting of the position of the reel, upsetting of the balance of the rig, or the like.

The foregoing and other objects and features of the invention will be fully understood from the following detailed description of a typical preferred form and carrying out of the invention, throughout which description reference is made to the accompanying drawings, in which:

FIG. 1 is an elevational view of the reel seat provided by this invention and showing it related to a pole construction, reel and line;

FIG. 2 is an enlarged detailed view of a portion of the structure shown in FIG. 1 with portions broken away to illustrate details of the construction;

FIG. 3 is a sectional view taken substantially as indicated by line 3—3 on FIG. 2; and FIG. 4 is a view taken substantially as indicated by line 4—4 on FIG. 2.

In FIG. 1 of the drawings I have shown my new reel seat S related to and between a pole tip T and a pole butt B to establish a fishing pole structure P and I have shown a reel R and line L related to the said pole structure P.

The pole tip T can be any suitable, typical fishing pole tip construction and is, essentially, an elongate substantially cylindrical unitary part having front and rear ends. The tip T is established of a suitable flexible material, such as fiber glass or bamboo, etc., and is tapered forwardly.

In accordance with common practice, the tip is provided with a plurality of longitudinally spaced ring-like line guides 10, one of which is shown, and through which the line L is threaded for guidance longitudinally of the pole tip.

In addition to the foregoing and in the preferred carrying out of the invention, the rear end of the pole tip is provided with an elongate, cylindrical metal ferrule 11. The pole butt B is an elongate, substantially cylindrical, rigid member having front and rear ends and, in the preferred carrying out of the invention and as illustrated, is provided with an elongate, metal ferrule 12 at its front end and a rubber cane tip 13 at its rear end. The butt can be established of a suitable hardwood, such as maple.

The reel R is a typical spool type reel and includes a frame F comprising a pair of disc-shaped, axially aligned, laterally spaced side plates 14 and 15, a plurality of circumferentially spaced tie bars 16 fixed to and extending between the plates, a spool 17 arranged within the frame, to extend between and rotatably carried by the plates and on which the line L is wound and drive means for rotating the spool and including a manually engageable crank 18 with a handle 19 rotatably carried by the plate 15.

In addition to the foregoing, the reel includes a reel seat saddle C to facilitate mounting fixing the reel to the reel seat of a fishing pole.

The saddle C includes an elongate seat engaging pad at the bottom side of the reel frame, intermediate the plates and on an axis normal to the frame and spool, that is, so that it extends longitudinally of the reel seat of the pole construction with which it is to be related. The pad 20 is supported by a pair of central laterally projecting, wing-like projections 21 suitably fixed to the sides of the frame.

It is to be noted that the saddle construction, in addition to providing mounting means for the reel, also serves as a tie means for the plates, at the lower or bottom side of the reel.

The bottom surface of the pad 20 is laterally curved, or downwardly concaved so as to cooperatively engage over and seat on the top side of a conventional, cylindrical reel seat.

The ends of the pad, projecting forwardly and rearwardly from the central portion of the pad, where the wing-like projections occur, establish forwardly and rearwardly projecting tab-like portions, normally adapted to be engaged by the retaining collars and sleeves of conventional reel seats.

The saddle C, in addition to the above, is provided with a pair of laterally spaced depending threaded studs 22, which studs are part of a substitute or supplemental reel mounting means. The studs are normally adapted to occur at the opposite sides of a conventional reel seat and to engage through apertures in a clamp plate (not shown) extending transversely below the reel seat and carry nuts 23 to engage the clamp plate and to effect clamping of the reel seat to the pad 20. The studs are removable in the event that the supplemental or substituted mounting means is not necessary or desired.

The foregoing is typical of the present day, standard or conventional spool type fishing reel.

The reel seat S provided by this invention is a unitary part cast of aluminum brass or the like, or molded of any suitable strong and durable plastic, such as nylon, etc.

The reel seat S is an elongate structure which is of uniform construction and is reversible end for end, but which will be described as having front and rear ends, for the purpose of this disclosure.

The reel seat S has like, straight, axially aligned, cylindrical, forwardly and rearwardly opening, tubular front and rear end portions 30 and 31 and a substantially U-shaped, upwardly opening central portion 32 having a rounded base 33 and upwardly divergent front and rear legs 4 and 5 joined integrally with the rear end of the front end portion 30 and front end of the rear end portion 31, as illustrated.

The central portion 32 is substantially U-shaped in cross-section, opening inwardly and upwardly and defines laterally spaced, side flanges 36.

In addition to the above and formed integrally in the base 33, is a straight, longitudinally extending, substantially semi-cylindrical seat 38 defining an upwardly disposed crowned or convex seat surface 39 to cooperatively engage or to be engaged by the pad 20 of the saddle C of the reel R.

The top of the seat 38 occurs above the upper or inner side of the base 33 of the central portion of the reel seat and the ends of said seat 38 extend into the confines of the flanges 36 of the legs 35 of the central portion and in such a manner as to define upwardly and longitudinally inwardly opposing pocket-like recesses at the opposite ends of the seat 38.

Finally, the reel seat is provided with central, laterally outwardly projecting wing-like flanges 40 at the opposite sides of the base 33, each of which is provided with a laterally extending, vertical stud-receiving slot 41.

The ferrule 11 on the rear end of the pole tip T is slidably engaged in the front portion of the reel seat S and the ferrule 12 on the front end of the butt B is slidably engaged in the rear portion 31 of the reel seat S, releasably connecting the elements or parts T, S and B together to establish a fishing pole assembly.

The reel R is arranged within the U-shaped central portion 32 of the reel seat with the axis of the reel spool 17 extending transverse the axis of the pole assembly, with the central, vertical, longitudinal plane of the pole assembly parallel with the central radial plane of the spool 17 and with the pad 20 of the reel saddle engaged and seated on the surface 39 of the seat portion 30 of the reel seat.

The front and rear tab-like end portions of the pad extend into the pockets or between the side flanges 36 of the legs 35 of the reel seat and are suitably retained thereby against turning and becoming misaligned on a horizontal plane and which would result in turning the reel R about its central vertical axis with resulting misalignment of the spool 17 relative to the pole assembly.

The studs 22 carried by the saddle C of the reel and projecting downwardly therefrom, at the opposite sides of the pad 20 depend through the slots 41 in the flanges 40.

Suitable nuts 23, such a wing nuts, are engaged on the lower ends of the studs and are advanced into engagement with the bottom of the flanges and to draw and hold the pad into tight seated engagement on the seat 38, thereby fixing the reel in and on the reel seat.

The seat portion 38 of the reel seat is downwardly offset from and is parallel with the axis of the front and rear portions 30 and 31 of the reel seat so that the axis of the reel crank 18 substantially intersects the axis of the portions 30 and 31 and the primary axis of the pole assembly and so that the axis of the spool 17 of the reel is substantially closer to the axis of the pole than is possible with use of an ordinary or conventional reel seat.

With the structure set forth above, it will be apparent that the novel reel seat provided results in a pole and reel assembly that is neat, compact and well-balanced.

The seat portion of the reel seat is of sufficient longitudinal extent, the leg portions 34 and 35 are upwardly divergent and the slots 41 in the flanges 40 are elongated so that the reel seat is suitable for and capable of cooperatively receiving and mounting reels of several different sizes and the reels of different manufacturers. Accordingly, the reel seat can be used in combination with the several different most popular sizes of reels and with those reels of the major manufacturers of such reels.

Having described only a typical preferred form and application of my invention, I do not wish to be limited or restricted to the specific details herein set forth, but wish to reserve to myself any modifications and/or variations that may appear to those skilled in the art.

Having described my invention, I claim:

1. A fishing rig including a pole assembly, a reel and a fishing line, said pole assembly including an elongated pole tip with front and rear ends, an elongate pole butt with front and rear ends and a novel elongate reel seat with front and rear ends between and connected with said tip and butt, said reel seat having elongate, axially aligned and axially spaced, tubular front and rear portions and in which the adjacent ends of the tip and butt are engaged, an upwardly opening U-shaped central portion with a central, elongate, straight, longitudinally extending seat with a laterally crowned carrier top surface and with central, laterally outwardly projecting flanges each with a central laterally extending vertical slot, said reel having an elongate, horizontal, laterally extending open frame on an axis normal to the axis of the pole assembly, a spool within the frame on an axis parallel therewith, a manually engageable operating crank at one end of the frame on an axis parallel therewith and a mounting saddle at the lower side of the frame, said saddle having a central, elongate pad with a downwardly disposed, laterally curved concave surface engaged and seated on said crowned carrier top surface of said reel seat, a pair of laterally spaced depending studs carried by the saddle and depending through the slots in the flanges and nuts on the studs and engaging the flanges to hold the saddle down with the pad tight on the seat.

2. A fishing rig as set forth in claim 1, wherein said top surface and reel pad are parallel with and spaced below the axis of the front and rear portions of the reel seat.

3. A fishing rig as set forth in claim 1, wherein said central portion has laterally spaced retaining flanges adjacent the sides of the end portions of the saddle pad to hold or maintain the pad aligned with the seat.

4. A fishing rig as set forth in claim 1, wherein said central portion has laterally spaced retaining flanges adjacent the sides of the end portions of the saddle pad to hold or maintain the pad aligned with the seat, said top surface and reel pad are parallel with and spaced below the axis of the front and rear portions of the reel seat.

5. A fishing rig as set forth in claim 1, wherein said central portion has laterally spaced retaining flanges adjacent the sides of the end portions of the saddle pad to hold or maintain the pad aligned with the seat, the axis of the end portions of the seat intersecting the reel spool.

6. A fishing rig as set forth in claim 1, wherein said seat of said reel seat is greater in longitudinal extent than the saddle pad and the slots are on a common plane intermediate the ends of the seat, each slot extending laterally inwardly and laterally outwardly from the axis of its related stud, whereby the relative size and dimensions of the reel seat and the reel can be varied.

7. A fishing rig as set forth in claim 1, wherein said seat of said reel seat is greater in longitudinal extent than the saddle pad and the slots are on a common plane intermediate the ends of the seat, each slot extending laterally inwardly and laterally outwardly from the axis of its related stud, whereby the relative size and dimensions of the reel seat and the reel can be varied, said top surface and reel pad being parallel with and spaced below the axis of the front and rear portions of the reel seat.

8. A fishing rig as set forth in claim 1 wherein said seat of said reel seat being greater in longitudinal extent than the saddle pad and the slots are on a common plane intermediate the ends of the seat, each slot extending laterally inwardly and laterally outwardly from the axis of its related stud, whereby the relative size and dimensions of the reel seat and the reel can be varied, said central portion has laterally spaced retaining flanges adjacent the sides of the end portions of the saddle pad to hold or maintain the pad aligned with the seat.

9. A fishing rig as set forth in claim 1 wherein said seat of said reel seat being greater in longitudinal extent than the saddle pad and the slots are on a common plane intermediate the ends of the seat, each slot extending laterally inwardly and laterally outwardly from the axis of its related stud, whereby the relative size and dimensions of the reel seat and the reel can be varied, said central portion has laterally spaced retaining flanges adjacent the sides of the end portions of the saddle pad to hold or maintain the pad aligned with the seat, the central portion of the reel seat being spaced below the axis of the front and rear portions of the reel seat, whereby the axis of said front and rear portions intersect the spool.

References Cited

UNITED STATES PATENTS

| | | | |
|---|---|---|---|
| 1,923,035 | 8/1933 | Hoerle et al. | 43—22 |
| 1,991,407 | 2/1935 | Miller et al. | 242—84.5 |
| 2,198,588 | 4/1940 | Stephens | 43—22 |
| 2,929,578 | 3/1960 | Hull | 43—22 X |
| 2,955,376 | 10/1960 | Zeigler | 43—22 |

WARNER H. CAMP, Primary Examiner